United States Patent
Bhatti

(10) Patent No.: US 11,909,268 B2
(45) Date of Patent: Feb. 20, 2024

(54) INTEGRATED ROTOR

(71) Applicant: ZF Active Safety US Inc., Livonia, MI (US)

(72) Inventor: Irfan Bhatti, Farmington Hills, MI (US)

(73) Assignee: ZF Active Safety US Inc., Livonia, MI (US)

( * ) Notice: Subject to any disclaimer, the term of this patent is extended or adjusted under 35 U.S.C. 154(b) by 68 days.

(21) Appl. No.: 17/198,424

(22) Filed: Mar. 11, 2021

(65) Prior Publication Data

US 2022/0294287 A1   Sep. 15, 2022

(51) Int. Cl.
| H02K 1/27 | (2022.01) |
| H02K 1/28 | (2006.01) |
| H02K 1/278 | (2022.01) |
| H02K 7/04 | (2006.01) |

(52) U.S. Cl.
CPC .............. H02K 1/278 (2013.01); H02K 1/28 (2013.01); H02K 7/04 (2013.01)

(58) Field of Classification Search
CPC ............ H02K 1/27; H02K 1/278; H02K 1/28; H02K 1/30; H02K 21/14
See application file for complete search history.

(56) References Cited

U.S. PATENT DOCUMENTS

| 10,673,302 | B2 | 6/2020 | Horng et al. |
| 2007/0296297 | A1 | 12/2007 | Jones et al. |
| 2009/0026859 | A1 | 1/2009 | Kinoshita et al. |
| 2014/0271280 | A1 | 9/2014 | Ley et al. |
| 2015/0084475 | A1 | 3/2015 | Ando et al. |
| 2017/0252985 | A1 | 9/2017 | Wang et al. |
| 2018/0198326 | A1 | 7/2018 | Ando et al. |
| 2018/0219446 | A1 | 8/2018 | Yamada et al. |
| 2020/0028392 | A1 * | 1/2020 | Zhang .................... H02K 21/14 |

FOREIGN PATENT DOCUMENTS

| CN | 201780277 U | 3/2011 | |
| CN | 209358312 U | 9/2019 | |
| CN | 110504773 A | 11/2019 | |
| DE | 102016121298 A1 * | 5/2018 | ............. H02K 1/278 |
| DE | 102019118646 * | 1/2020 | ............... H02K 1/27 |
| IN | 110978376 A | 4/2020 | |
| KR | 20080095647 * | 10/2008 | |
| KR | 20180037757 * | 4/2018 | ............... H02K 1/28 |
| KR | 20210023152 * | 3/2021 | |
| WO | 2020/012420 A2 | 1/2020 | |
| WO | 2020/034266 A1 | 2/2020 | |

OTHER PUBLICATIONS

Barrans, Simon, and Levi Mallin. "Mechanical Design of Rotors with Surface Mounted Permanent Magnets." Electric Machines for Smart Grids Applications-Design, Simulation and Control. IntechOpen, 2018.

* cited by examiner

Primary Examiner — Tran N Nguyen
(74) Attorney, Agent, or Firm — Robert James Harwood

(57) ABSTRACT

A rotor assembly for a motor includes at least one magnet, a magnet support having an end region, a rotor shaft and an over-molded body affixed to the at least one magnet and the magnet support. The over-molded body includes a first end and a second end. The rotor shaft may be disposed proximate to the first end of the over-molded body and the second end of the over-molded body is proximate to the end region of the magnet support.

12 Claims, 8 Drawing Sheets

INTEGRATED ROTOR

TECHNICAL FIELD

The present invention relates to a rotor used in a motor, and more specifically, to a rotor with an over-molded body that can be used with any desired yoke.

BACKGROUND OF THE DISCLOSURE

There are various techniques used to attach permanent magnets in a rotor assembly for a permanent magnet motor and other permanent magnet machines. However, traditional techniques typically require the assembly of several parts which increase cost and manufacture time.

Therefore, in electric motors, it is desirable to reduce the number and complexity of machined parts in order to reduce costs and manufacturing time. Further, it is advantageous to reduce the weight of moving motor components to diminish the moment of inertia of the motor when operating in dynamic situations for quick start and stop application.

SUMMARY

The present invention relates in general to a rotor of an electric motor. More specifically, the invention pertains to a permanent magnet rotor wherein the rotor is formed using permanent magnets secured to a carrier and over-molded with plastic.

In one embodiment, the rotor assembly for a motor may include a rotor shaft, at least one magnet (one or more magnets), and an over-molded body. The over-molded body may include a first end and a second end wherein the over-molded body is affixed to the at least one magnet via an overmolding process. The rotor shaft may be affixed proximate to the first end of the over-molded body and the second end of the over-molded body may be configured to receive one of a variety of yokes having a sensor ring. In this embodiment, the rotor assembly may further include a magnet support wherein the over-molded body couples the at least one magnet, magnet support and rotor shaft to each other. The rotor assembly may further include at least one protrusion defined in the over-molded body wherein the at least one protrusion is configured to balance the rotor assembly. The protrusion or protrusions may be defined on an outer surface of the over-molded body.

In another embodiment, the rotor assembly for a motor may include a rotor shaft, at least one magnet (one or more magnets), and an over-molded body. The over-molded body may include a first end and a second end wherein the over-molded body is affixed to the at least one magnet via an overmolding process. The rotor shaft may be affixed proximate to the first end of the over-molded body and the second end of the over-molded body may be configured to receive one of a variety of yokes having a sensor ring. In this embodiment, a magnet support may also be provided to engage with the rotor shaft wherein the over-molded body couples the at least one magnet to the magnet support (which is affixed to or engaged with the rotor shaft). The rotor assembly may further include at least one protrusion defined in the over-molded body wherein the at least one protrusion is configured to balance the rotor assembly. The protrusion or protrusions may be defined on an outer surface of the over-molded body.

In yet another embodiment, the rotor assembly for a motor may include a rotor shaft, at least one magnet (one or more magnets), and an over-molded body. The over-molded body may include a first end and a second end wherein the over-molded body is affixed to the at least one magnet via an over-molding process. The rotor shaft may be affixed proximate to the first end of the over-molded body and the second end of the over-molded body may be configured to receive one of a variety of yokes having a sensor ring. The aforementioned over-molded body of this embodiment is configured to couple the at least one magnet to the rotor shaft. The rotor assembly may further include at least one protrusion defined in the over-molded body wherein the at least one protrusion is configured to balance the rotor assembly. The protrusion or protrusions may be defined on an outer surface of the over-molded body.

BRIEF DESCRIPTION OF THE DRAWINGS

One set of black and white line drawings are submitted as follows:

FIG. 6A is a cross-sectional view of the rotor assembly of FIG. 5B along line 5a-5a.

DETAILED DESCRIPTION

Figure 1:
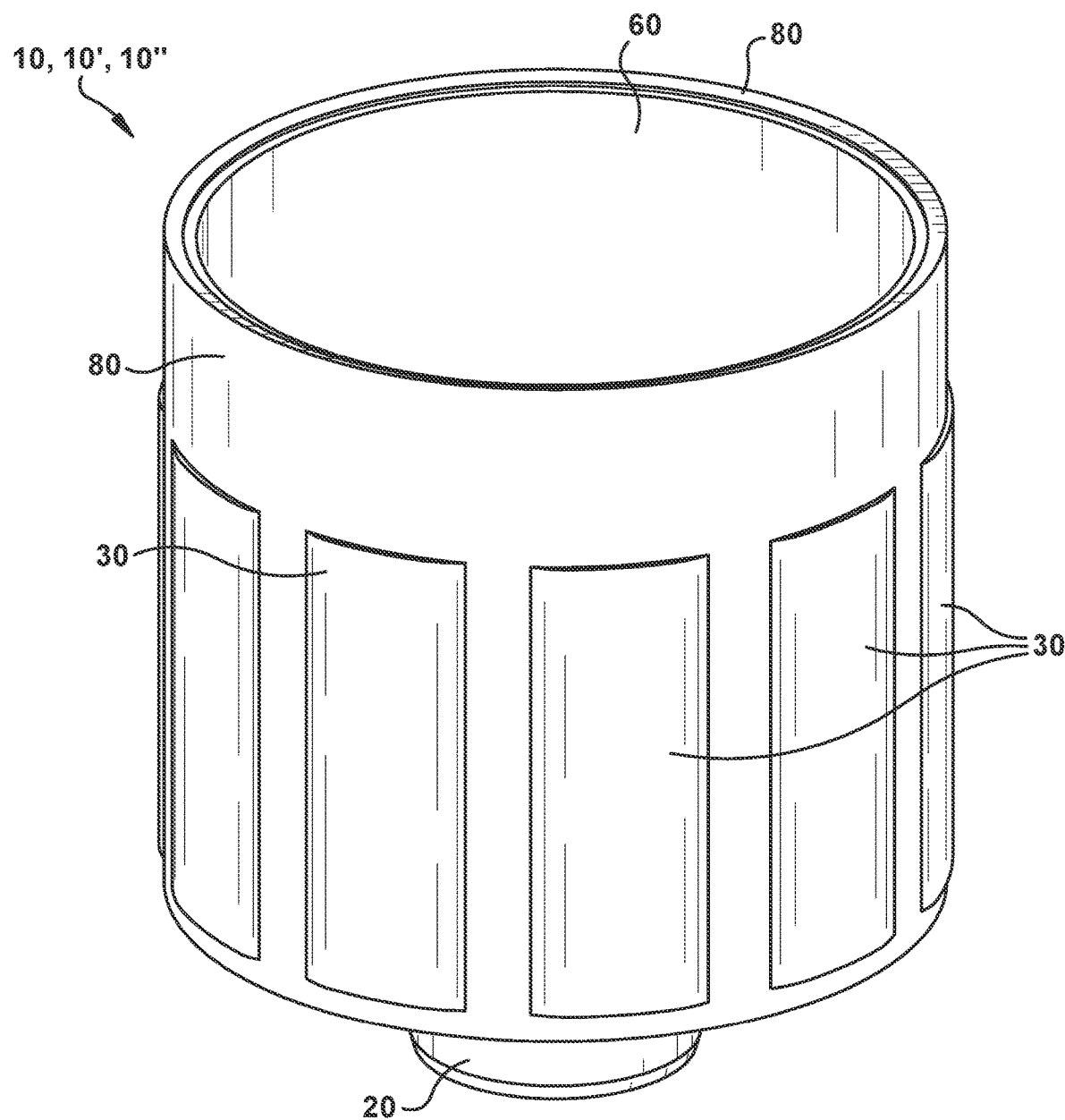
FIG. 1 is a perspective view of a rotor assembly according to various embodiments of the present disclosure.

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary; percent, "parts of," and ratio values are by weight; the description of a group or class of materials as suitable or preferred for a given purpose in connection with the present disclosure implies that mixtures of any two or more of the members of the group or class are equally suitable or preferred; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any manner.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this present disclosure pertains.

The following detailed description is merely exemplary in nature and is not intended to limit the present disclosure or the application and uses of the present disclosure. Furthermore, there is no intention to be bound by any theory presented in the preceding background or the following detailed description.

Referring now to FIG. 1, a rotor assembly 10, 10', 10" according to various embodiments of the present disclosure is shown. The rotor assembly 10, 10', 10" may be a permanent magnet rotor assembly driven by a stator (element 59 in FIG. 3). The rotor assembly 10, 10', 10" according to various embodiments of the present disclosure includes a rotor shaft 20, a magnet support 60, at least one magnet 30 and an over-molded body 80. The rotor shaft 20 is configured to drive a rotatable element, such as a ball screw (not shown) or other rotatable shaft element (not shown). The rotor shaft 20 may further be configured to engage a bearing mounted to a motor housing. As best illustrated in the example FIG. 2A, the rotor shaft 20 may comprise several stepped portions 22 and 24, of varying diameters corresponding to the bearing diameter. As shown in FIGS. 2B and 4, the rotor shaft 20 further comprises an outermost edge 26 that is secured to the magnet support 60 via a welding process or the like thereby creating a joint 27 between the magnet support 60 and the rotor shaft 20. It is contemplated that the outermost edge 26 and inner surface of the magnet support 60 may have mating flat surfaces to help prevent slippage between the magnet support and the rotor shaft 20.

Figure 4:
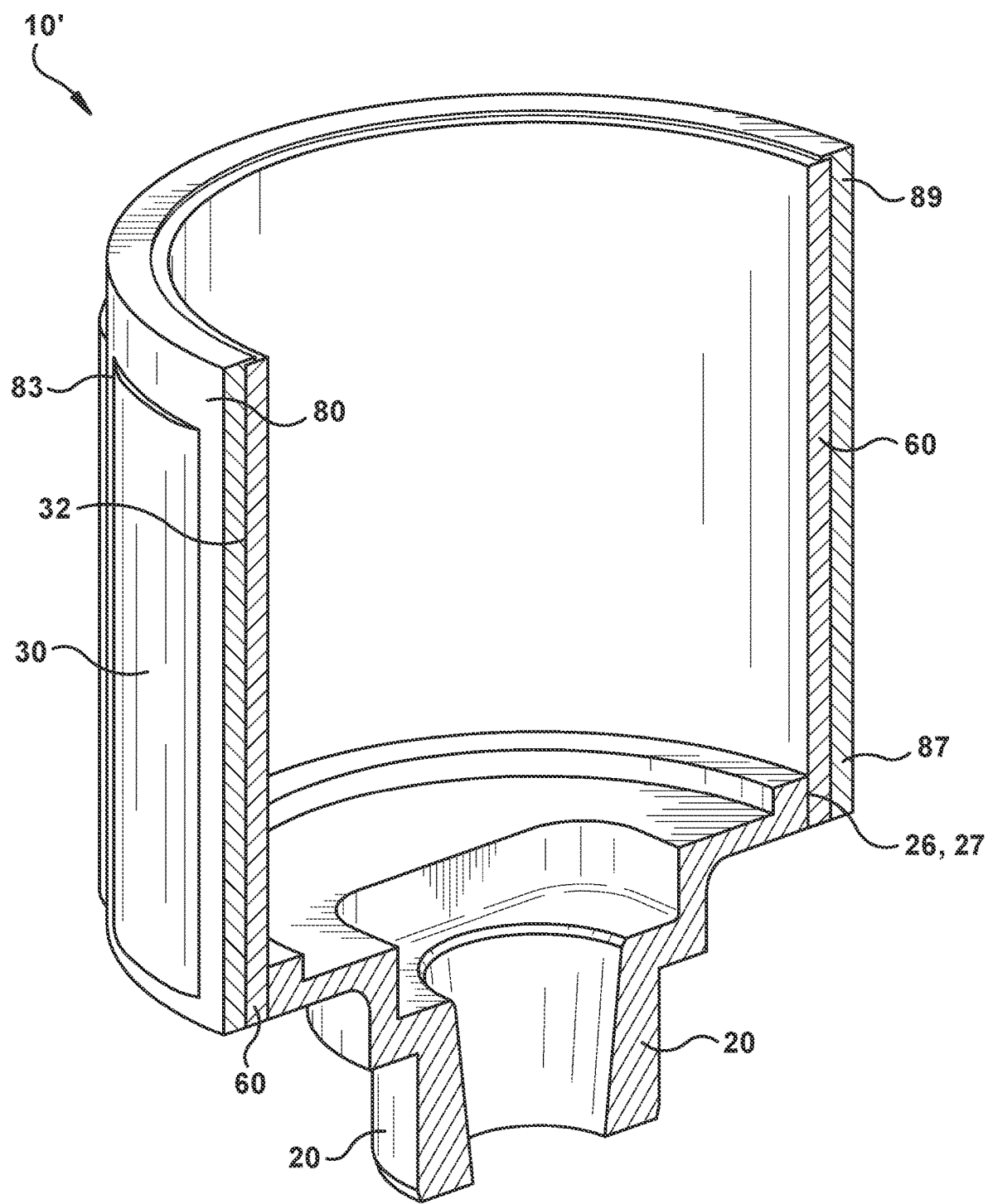
FIG. 4 is a cross-sectional view of a second embodiment rotor assembly of the present disclosure.
Figure 5:
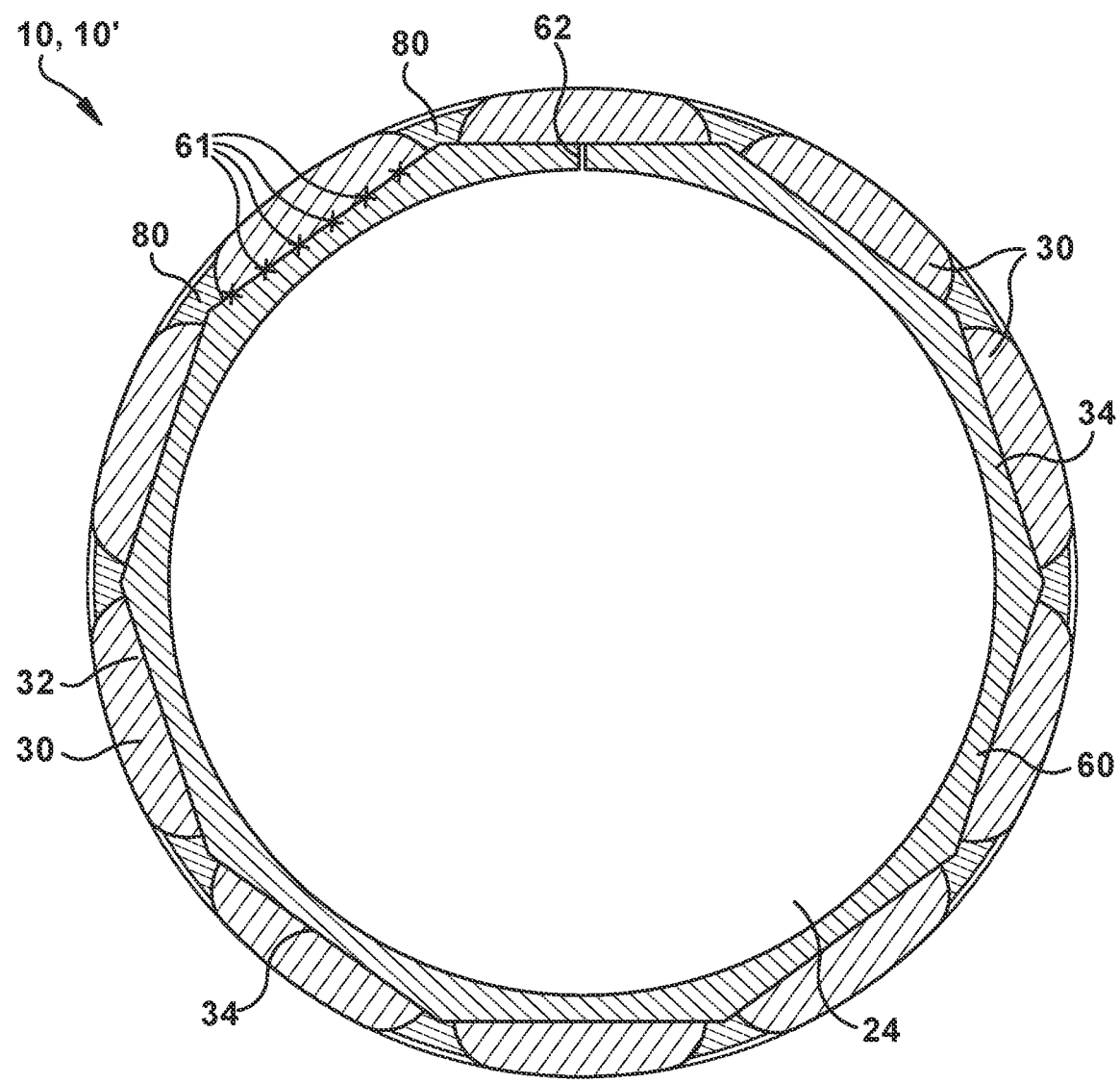
FIG. 5 is a cross-sectional view of the rotor assembly shown in FIG. 1.

With respect to the various embodiments of the present disclosure, magnet support 60 is a generally annular shaped metallic support that is configured to support a plurality of magnets 30 on the outer surface 32 (see FIGS. 4-5) of the magnet support 60. The outer surface 32 may have a plurality of planar portions 34. The planar portions 34 may be formed in any desired manner. It is contemplated that the planar portions 34 may be formed by broaching or cutting the outer surface 32. The magnet support 60 may be created as a machined part, sintered, deep-drawn, or by other manufacturing means. For example, the magnet support 60 can be machined from a block of metal or formed from a sheet of metal and formed into an annular shape, as shown in FIG. 5. The magnet support 60 may have a seam 62 extending along the axial length of the support if the support is formed from a sheet of metal. The seam 62 may be laser welded so that the support 60 retains the generally annular shape.

The magnet support 60 may be affixed to the rotor shaft 20 at the outermost diameter 26 (see FIG. 4) via a welding process or the like. Each magnet 30 may be affixed to the magnet support 60 via the over-molded body 80 and an adhesive 61 (example shown in FIG. 5) provided between each magnet 30 and the magnet support 60. Accordingly, each magnet 30 may be secured directly to the magnet support 60 via the adhesive (and over-molded body) or indirectly connected to the magnet support 60 by the over-molded body 80 alone.

Also, with respect to the various embodiments of the present disclosure, the amount of plastic used in the over-molded body 80 for rotor assembly 10, 10', 10" can be adjusted. For example, the thickness of the over-molded body 80 can be made thinner for weight reduction or increased for balance and strength purposes. The over-molded body 80 may also have various apertures 83 (see FIG. 4) or slits in the body 80 to allow the magnets 30 and/or magnet support 60 to be exposed to air. This can enable better heat dissipation in the metallic parts and improve motor performance. Further, the over-molded body 80 can be made of a variety of materials. While standard plastics or nylon impregnated plastics can be utilized, it is with the scope of the disclosure that other materials can be present in the over-molded body. For example, the body 80 can have metallic particles or elements that improve the magnetic field of the magnets 30.

Moreover, according to the various embodiments of the present disclosure, the over-molded body 80 of the rotor assembly 10, 10', 10" can further have additional elements or surface textures to allow balancing. For example, optional protrusions 82 (FIG. 2A) can be provided or defined on the outer surface 32 of the over-molded body 80 such that the protrusion(s) 82 are removable and the number of protrusions 82 can removed to varying degrees to balance the rotor assembly 10. Alternatively, other features such as a groove or a slot (not shown) may be made along the outer surface 32 of the over-molded body 80 for similar balancing purposes. In addition, it is within the scope of the disclosure that the rotor assembly 10 may be balanced using additive manufacturing processes.

Therefore, as noted, the optional protrusions 82 (see FIG. 2A) may be defined in the over-molded body 80 in the rotor assembly 10 wherein one or more of the protrusions 82 is removable and is configured to balance the motor 72 of FIG.

Figure 2A:
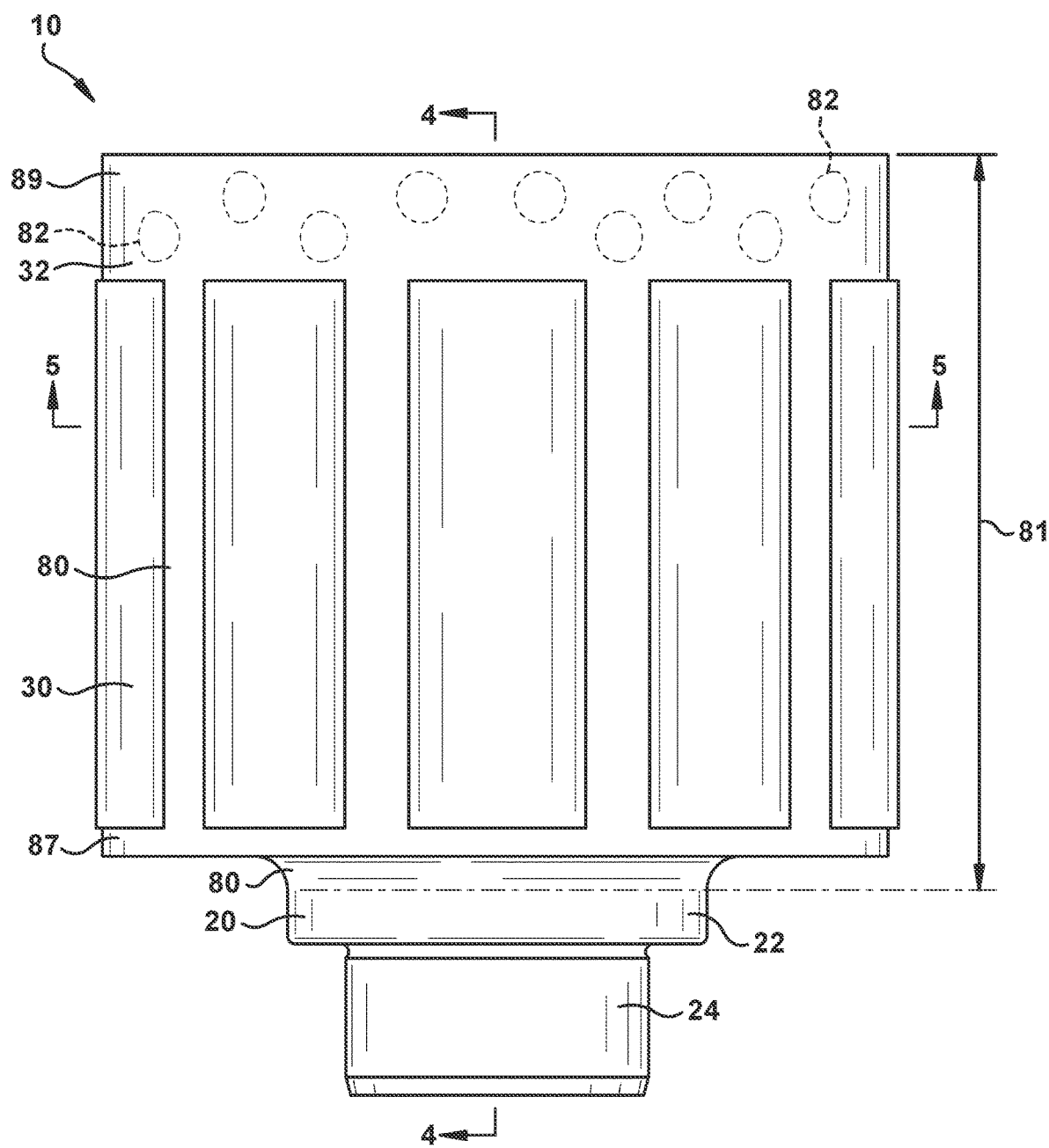
FIG. 2A is a side view of a first embodiment rotor assembly.
Figure 2B:
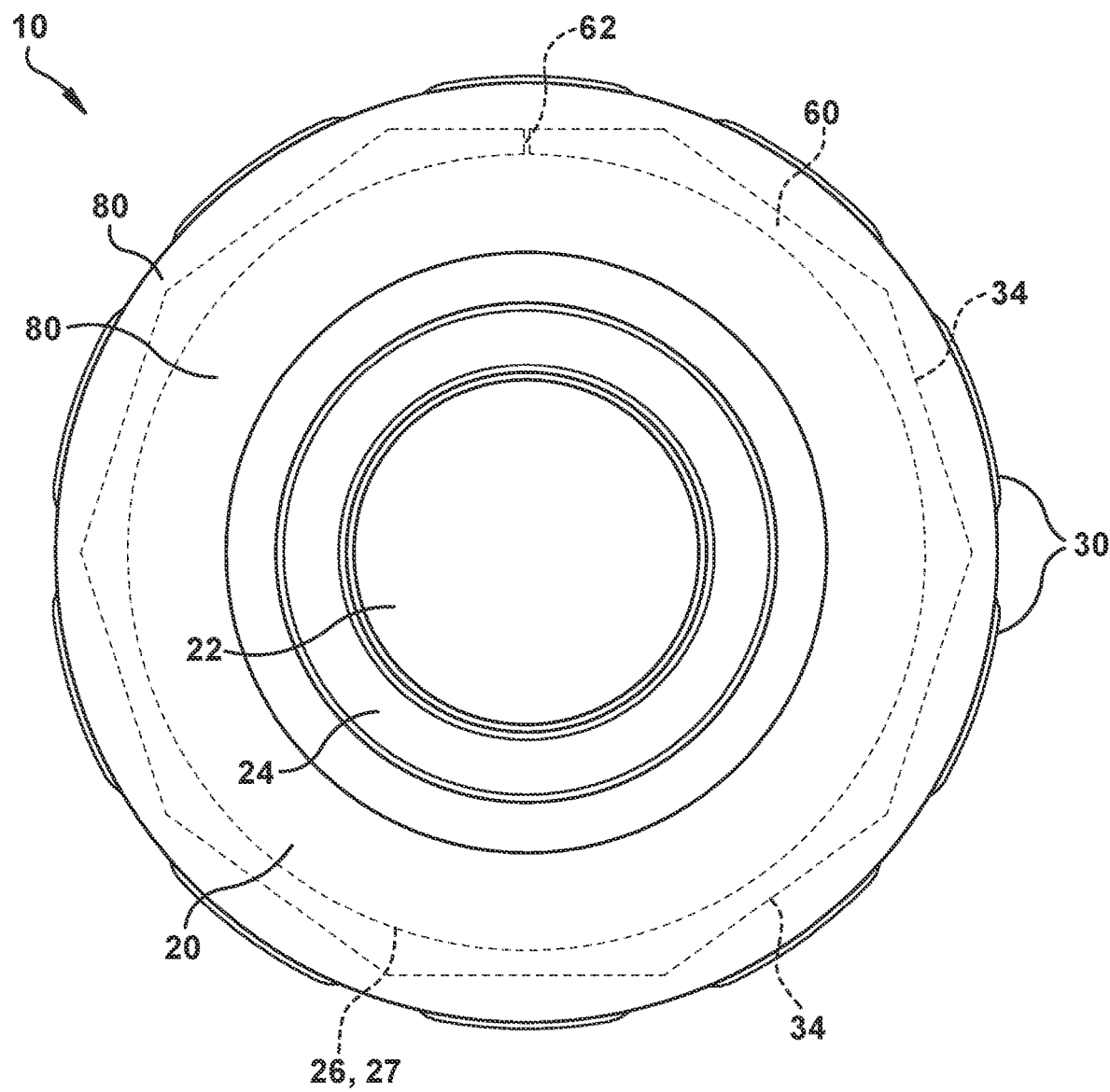
FIG. 2B is a bottom view of the first embodiment rotor assembly of FIG. 2A

2C or to balance the rotor assembly 10 of FIG. 2A. In a first embodiment rotor assembly 10 of the present disclosure shown in FIGS. 2A-2B, the over-molded body 80 may extend along the length 81 of the rotor 10 up to the rotor shaft 20 so that the over-molded body covers joint 27 (shown in FIGS. 2A-2B). As noted, the rotor shaft 20 and magnet support 60 are generally directly secured together via a welding process. However, the combined parts may then be placed in a mold with magnets 30 around magnet support 60 wherein the magnets 30 may be optionally affixed to the magnet support 60 with an adhesive 61. The body 80 is then over-molded onto the magnets, magnet support 60 and rotor shaft 20 via an over-molding process (see FIGS. 2A-2B) which secures the magnets 30 in place against the magnet support 60 and which further reinforces the joint 27 (between the rotor shaft 20 and the magnet support 60) located at outermost diameter 26 (see FIG. 2B). Various elements of the rotor assembly 10 may have features that assist the over-molded body 80 to be secured to the elements.

Figure 3:
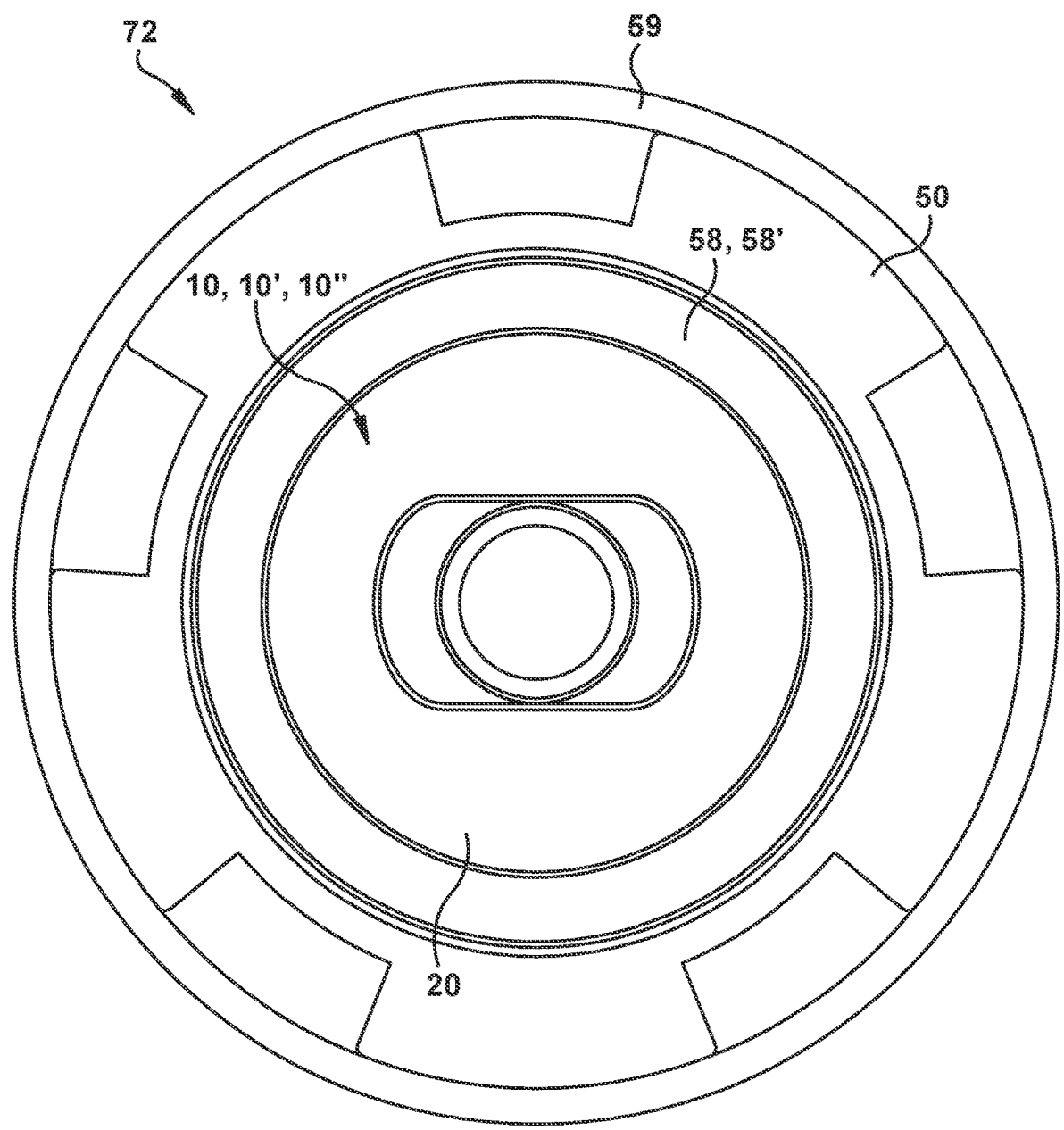
FIG. 3 is a top view of a rotor assembly accordingly to various embodiments of the present disclosure wherein the rotor assembly is installed in a motor.

With reference to FIG. 3, a motor 72 having a stator 59, a rotor assembly 10, 10', 10", a yoke 58, a sensor ring 50 are shown. It is noted that FIG. 3, in particular, illustrates the yoke 58 and rotor assembly 10, 10', 10" disposed within stator 59 thereby forming motor 72. The motor 72 of this embodiment may further include a magnet support 60 (see FIG. 4) partially disposed within the over-molded body 80 wherein the over-molded body 80 couples the magnet support 60 to the magnet(s) 30. A first embodiment rotor assembly 10 disposed within the motor 72 in FIG. 3, may but not necessarily have the magnet(s) 30 coupled to the rotor shaft 20 via the over-molded body 80, as shown in FIGS. 2A-2B—wherein the over-molded body 80 covers a portion of the rotor shaft 20 (including joint 27 where the rotor shaft 20 meets the magnet support 60). However, a second embodiment rotor assembly 10' (shown in FIG. 4) disposed within motor 72 (shown in FIG. 3) may further include a rotor shaft 20 and an over-molded body 80 configured to couple one or more magnets 30 to a magnet support 60. As shown in FIG. 4, the magnet support 30 of the second embodiment rotor assembly 10' may then be directly affixed to the rotor shaft 20 via a welding process or the like.

Figure 6A:
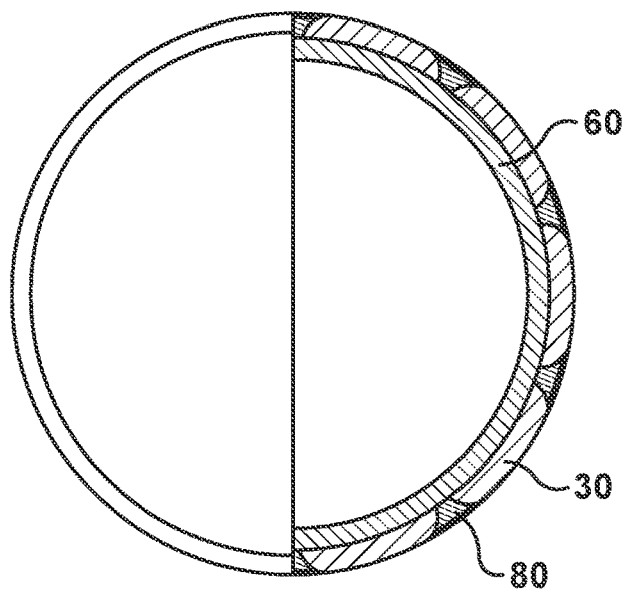
Figure 6B:
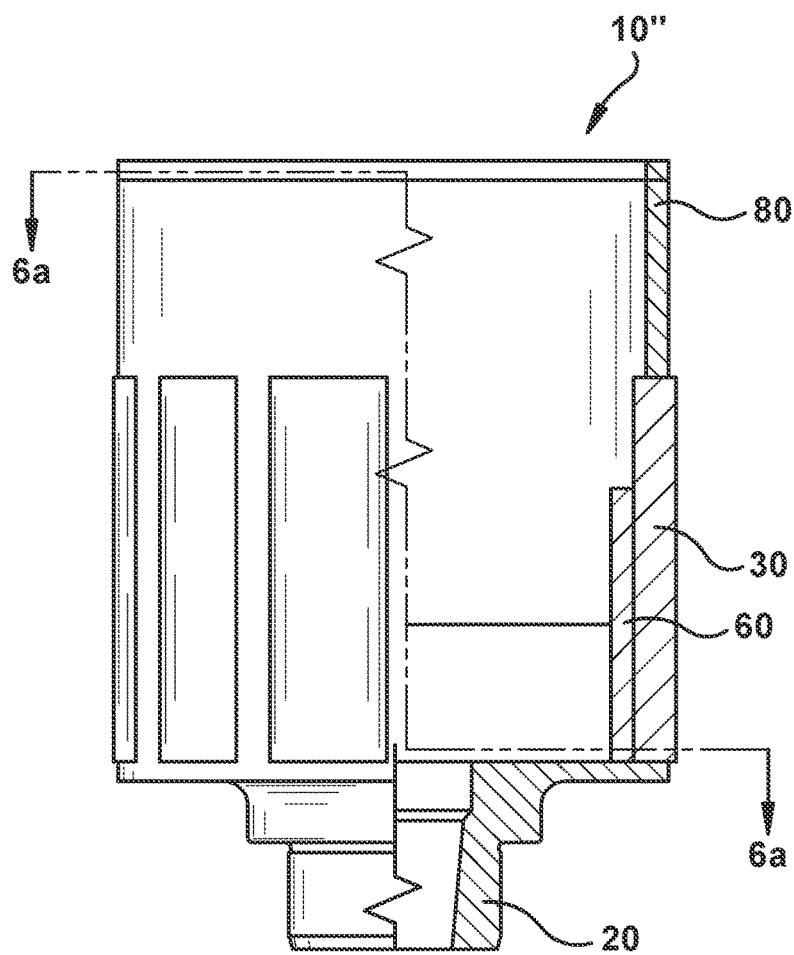
FIG. 6B is a side/cross-sectional view of another example embodiment rotor assembly where the rotor shaft has an integral magnet support (or core).

Referring now to FIG. 5, a cross-sectional view of the second embodiment of the rotor assembly 10 is shown where the magnet support 60 is affixed to the rotor shaft 20 via a laser weld or the like and the over-molded body does not couple the rotor shaft 20 to the magnet(s) 30. In yet another alternative (shown in FIG. 6B) (or third embodiment) rotor assembly 10", the rotor shaft 20 may have a magnet support 60 which is integral to the rotor shaft 20 so that the rotor shaft 20 and the magnet support 60 are formed by a single component. The over-molded body 80 shown in FIGS. 6A and 6B may or may not cover a portion of the rotor shaft 20. FIG. 6A is a cross-sectional view of the rotor assembly 10 of FIG. 6B along line 6A-6A to better illustrate where the magnets 30 are disposed relative to the magnet support 60 and how the over-molded body 80 affixes the magnet(s) 30 to the magnet support 60.

Therefore, in summary, the rotor assembly 10, 10', 10" for a motor 72 may include a rotor shaft 20, at least one magnet (one or more magnets) 30, and an over-molded body 80. In the first embodiment rotor assembly 10, the over-molded body 80 may be affixed to the magnet(s) 30, the magnet support 60 and the rotor shaft 20 thereby coupling the magnet(s) to the rotor shaft 20 (via the over-molded body 80). In a second embodiment rotor assembly 10', the over-molded body 80 may include a first end 87 and a second end 89 (shown in FIGS. 4 and 7) wherein the over-molded body 80 may be affixed to the magnet(s) 30 and magnet support 60 via an over-molding process as shown in FIG. 5. In a third embodiment rotor assembly 10", the magnet support 60 may be integral to the rotor shaft 20—regardless of how the body 80 is over-molded onto the magnets 30 and the magnet support 60.

Figure 7:
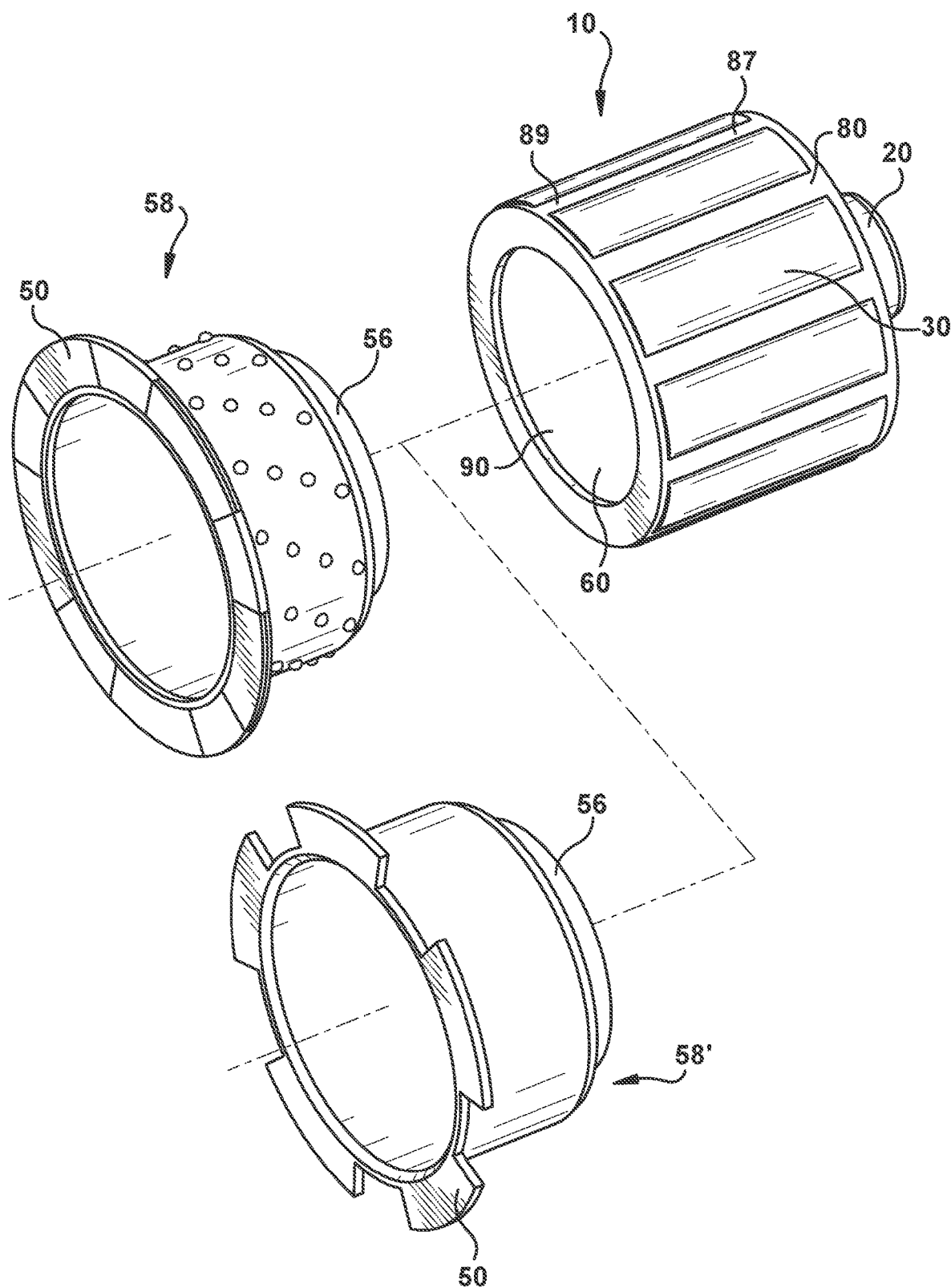
FIG. 7 illustrates a rotor assembly according to various embodiments of the present disclosure wherein the rotor assembly may interchangeably receive one of a variety of a plurality of yokes.

Moreover, regardless of how the body 80 is over-molded onto the magnet support 60 and the magnet(s) 30, the rotor shaft 20 may be affixed proximate to the first end 87 of the over-molded body 80 and the second end 89 of the over-molded body 80 may be proximate to one of a variety of yokes 58, 58' as shown in FIG. 7 such that the rotor assembly 10 according to the present disclosure provides a "flexible" design such that the rotor assembly 10 could engage with one of a variety of different yokes 58, 58'. In the non-limiting example of FIG. 7, either yoke 58, 58' may engage with an end region 90 of the magnet support 60.

In general, the yoke 58, 58' may include a sensor ring 50 as shown in FIGS. 3 and 7. It is understood that a journal portion 56 of the yoke 58, 58' engages with the end region 90 of the magnet support 60 which is disposed proximate to the yoke 58, 58'. Example, non-limiting methods of engagement between a yoke 58, 58' with this rotor assembly 10, 10', 10" include any one of the following: press-fitted engagement, laser-welded engagement, spin-welded engagement, glued engagement, or the like. The aforementioned journal portion 56 of the yoke, 58, 58' may, but not necessarily, be formed of either metal or plastic. Accordingly, the rotor assembly 10, 10', 10" of the present disclosure allows for any one of a variety of yokes 58, 58' which could be used interchangeably with this rotor assembly 10, 10', 10" as shown in FIG. 7.

As shown in FIG. 3, a motor 72 may include rotor assembly 10, 10', 10" having a rotor shaft 20, at least one magnet (one or more magnets) 30, and an over-molded body 80 wherein the over-molded body 80 may or may not be configured to couple the magnet(s) 30 to the rotor shaft 20 as shown in FIGS. 2A and 4. In the first embodiment rotor assembly 10 shown in FIGS. 2A-2B, the over-molded body 80 shown in FIG. 2A extends to the rotor shaft 20 and is affixed to both the rotor shaft 20, magnet support 60 and magnets 30 via an over-molding process such that body 80 covers joint 27 (see FIG. 2B).

As noted, according to the various embodiments of the rotor assembly 10, 10', 10" of the present disclosure, the over-molded body 80 may include a first end 87 and a second end 89. As shown in the first embodiment rotor assembly 10 in FIGS. 2A and 7, the rotor shaft 20 may be affixed to the first end 87 of the over-molded body 80 and the second end 89 of the over-molded body 80 may be proximate to one of a variety of yokes 58, 58' (see FIG. 7) having a sensor ring 50 (see FIG. 7) once a yoke 58, 58' engages with the rotor assembly 10. In contrast, in the second embodiment rotor assembly 10' of the present disclosure, the rotor shaft 20 is not affixed to the first end 87 of the over-molded body (see FIG. 4).

As noted, regardless of how the body 80 is over-molded onto the magnet support 60 and the magnet(s) 30, the rotor shaft 20 may be proximate to the first end 87 of the over-molded body 80 and the second end 89 of the over-molded body 80 may be proximate to one of a variety of yokes 58, 58' (as shown in FIG. 7) such that the rotor assembly 10, 10', 10" according to the present disclosure provides a "flexible" or "modular" design such that the rotor assembly 10, 10', 10" could engage with one of a variety of different yokes 58, 58'. In the non-limiting example of FIG. 7, either yoke 58, 58' may engage with an end region 90 of the magnet support 60.

The principle and mode of operation of this disclosure have been explained and illustrated in its preferred embodiment. However, it must be understood that this disclosure may be practiced otherwise than as specifically explained and illustrated without departing from its spirit or scope.

What is claimed is:

1. A rotor assembly for a motor comprising:
   a rotor shaft;
   a magnet support having an end region configured to engage with one of a plurality of yokes;
   at least one magnet disposed on the magnet support; and
   an over-molded body having a first end and a second end, the over-molded body being over-molded directly onto the at least one magnet and the magnet support to secure the at least one magnet to the magnet support;
   wherein the rotor shaft is disposed proximate to the first end of the over-molded body and the second end of the over-molded body is proximate to the end region of the magnet support.

2. The rotor assembly according to claim 1 wherein the over-molded body couples the at least one magnet, magnet support and rotor shaft to each other.

3. The rotor assembly according to claim 1 wherein the magnet support is affixed to the rotor shaft and the over-molded body is configured to couple the at least one magnet to the magnet support.

4. The rotor assembly according to claim 3 wherein the magnet support is integral to the rotor shaft.

5. The rotor assembly according to claim 2 further comprising at least one protrusion defined in the over-molded body and the at least one protrusion is configured to balance the rotor assembly.

6. The rotor assembly according to claim 3 further comprising at least one protrusion defined in the over-molded body and the at least one protrusion is configured to balance the rotor assembly.

7. The rotor assembly according to claim 4 further comprising at least one protrusion defined in the over-molded body and the at least one protrusion is configured to balance the rotor assembly.

8. The rotor assembly according to claim 5 wherein the at least one protrusion is defined on an outer surface of the over-molded body.

9. The rotor assembly according to claim 6 wherein the at least one protrusion is defined on an outer surface of the over-molded body.

10. The rotor assembly according to claim 7 wherein the at least one protrusion is defined on an outer surface of the over-molded body.

11. A rotor assembly for a motor, comprising:
    a rotor shaft;
    a magnet support having an end region configured to engage with one of a plurality of yokes;
    at least one magnet disposed on the magnet support and secured to the magnet support via an adhesive; and
    an over-molded body having a first end and a second end, the over-molded body being over-molded onto the at least one magnet and the magnet support such that the at least one magnet is secured to the magnet support via the over-molded body and the adhesive;
    wherein the rotor shaft is disposed proximate to the first end of the over-molded body and the second end of the over-molded body is proximate to the end region of the magnet support.

12. A rotor assembly according to claim 1 for a motor, comprising:
    a rotor shaft;
    a magnet support having an end region configured to engage with one of a plurality of yokes;
    at least one magnet disposed on the magnet support; and
    an over-molded body having a first end and a second end, the over-molded body being over-molded onto the at least one magnet and the magnet support to secure the at least one magnet to the magnet support;
    wherein the at least one magnet is affixed to the magnet support via an adhesive prior to the over-molded body being over-molded onto the at least one magnet and magnet support; and
    wherein the rotor shaft is disposed proximate to the first end of the over-molded body and the second end of the over-molded body is proximate to the end region of the magnet support.

* * * * *